United States Patent
Cordes et al.

(10) Patent No.: US 8,036,009 B2
(45) Date of Patent: Oct. 11, 2011

(54) METHOD FOR SUPPLYING AND DISCHARGING POWER TO AND FROM A RESISTIVE-INDUCTIVE LOAD, AND RECTIFIER USED THEREIN

(75) Inventors: Ralf Cordes, Erlangen (DE); Gerd Griepentrog, Gutenstetten (DE); Jürgen Rupp, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 643 days.

(21) Appl. No.: 11/992,768

(22) PCT Filed: Sep. 11, 2006

(86) PCT No.: PCT/EP2006/066211
§ 371 (c)(1),
(2), (4) Date: Mar. 28, 2008

(87) PCT Pub. No.: WO2007/039409
PCT Pub. Date: Apr. 12, 2007

(65) Prior Publication Data
US 2009/0290394 A1  Nov. 26, 2009

(30) Foreign Application Priority Data
Sep. 30, 2005  (DE) .................... 10 2005 047 541

(51) Int. Cl.
*H02M 7/217*  (2006.01)
(52) U.S. Cl. ........................................... 363/89; 363/127

(58) Field of Classification Search .................. 363/89, 363/127
See application file for complete search history.

(56) References Cited

U.S. PATENT DOCUMENTS

| | | | | |
|---|---|---|---|---|
| 4,922,404 | A | * | 5/1990 | Ludwig et al. .................. 363/89 |
| 5,714,847 | A | * | 2/1998 | Lindauer et al. ............... 315/307 |
| 2002/0121953 | A1 | | 9/2002 | Ries et al. |
| 2005/0135127 | A1 | * | 6/2005 | Hamilton ......................... 363/89 |
| 2006/0014502 | A1 | * | 1/2006 | Walbracht ..................... 455/126 |
| 2009/0290394 | A1 | * | 11/2009 | Cordes et al. .................. 363/126 |
| 2010/0177536 | A1 | * | 7/2010 | Liu ................................. 363/17 |

FOREIGN PATENT DOCUMENTS

| | | |
|---|---|---|
| CN | 1363937 A | 8/2002 |
| DE | 3926204 A1 | 2/1991 |
| DE | 100 14 641 A1 | 10/2001 |

(Continued)

OTHER PUBLICATIONS

IEEE Transactions on Applied Superconductivity, vol. 15, No. 2, Jun. 2005, Seiten 1465-1468, M. P. Oomen, M. Leghissa et al.; "HTS Flux Pump for Cryogen-Free HTS Magnets".

(Continued)

*Primary Examiner* — Jeffrey Sterrett
(74) *Attorney, Agent, or Firm* — Staas & Halsey LLP (57) ABSTRACT

Power is supplied to excitation windings in order to generate magnetic fields, preferably for activating superconducting coils. An AC transformer is used, and triggering of the coil is performed via a rectifier having little power loss. Preferably, a two-way rectifier using a freewheeling circuit is utilized in the associate device, thus preventing losses when power is supplied and especially when the power is discharged.

15 Claims, 5 Drawing Sheets

FOREIGN PATENT DOCUMENTS

| | | |
|---|---|---|
| DE | 100 65 400 A1 | 7/2002 |
| EP | 0 154 779 A1 | 9/1985 |
| EP | 1 434 339 A2 | 6/2004 |
| WO | 95/07571 | 3/1995 |
| WO | WO 01/58005 A2 | 8/2001 |
| WO | WO 03/047077 A1 | 6/2003 |

OTHER PUBLICATIONS

IEEE Transactions on Magnetics, vol. 25, No. 2, Mar. 1989, Seiten 1771-1774, J.Sikkenga, H.H.J. ten Kate; A full scale superconducting rectifier for powering an MRI-Magnet.

European Office Action mailed Aug. 10, 2009 in corresponding European Patent Application 06 793 393.7.

* cited by examiner

METHOD FOR SUPPLYING AND DISCHARGING POWER TO AND FROM A RESISTIVE-INDUCTIVE LOAD, AND RECTIFIER USED THEREIN

CROSS REFERENCE TO RELATED APPLICATIONS

This application is based on and hereby claims priority to German Patent Application No. 10 2005 047 541.8 filed on Sep. 30, 2005 and PCT Application No. PCT/EP2006/066211 filed on Sep. 11, 2006, the contents of which are hereby incorporated by reference.

BACKGROUND OF THE INVENTION

The invention relates to a method for supplying energy to and discharging energy from a resistive-inductive load or a pure inductance.

Applications for the excitation windings can be found in medical appliances or else in synchronous machines, for example. By supplying energy to and discharging energy from the excitation winding, the excitation current is raised or lowered and hence the strength of the magnetic field influenced.

Often, such excitation windings are also made from HTS (High Temperature Superconductor) materials which need to be kept at a temperature of <80 K in order to maintain superconductivity. To maintain this low temperature, supply of heat from the outside and generation of heat in the cooled area need to be largely avoided.

The electrical power required for excitation and de-excitation is often very high because the process of excitation and de-excitation needs to take place very quickly in order to achieve a high control quality. To avoid high losses when supplying and discharging electrical power in order to alter the current through the inductive load, it is advantageously possible to use a relatively high voltage and to perform voltage transformation directly before the inductive load is fed.

To feed the excitation winding directly from the outside, the high current levels in the region of up to a few 100 A mean that it is necessary to use lines having an appropriate cross section which are therefore also good conductors of heat. Instead, it is better for the balance of thermal power loss if relatively high voltages are used for the supply of energy from the hot to the cold area and hence the conductor cross section is reduced. The voltage then likewise needs to be transformed by a transformer in the cold area and rectified in order to feed the excitation winding.

Specifically in the case of applications for superconductive excitation windings in which the energy is transferred from the ambient temperature (what is known as the "hot area") to a temperature which allows superconduction (what is known as the "cold area"), this results in reduced losses in the bushings from the hot to the cold area.

SUMMARY

Against this background, it is one possible object to specify a method and circuit device for supplying energy to and discharging energy from an inductance. The inventors propose specifically designed rectifiers and actuating methods for the converter valves contained therein.

The inventors propose a specific regime of actuation for a specific rectifier circuit which can be used to achieve particularly low-loss operation of the rectifier when feeding resistive-inductive loads by virtue of the current being commutated between different rectifier paths with little loss. This relates both to the phase of the inductance's excitation and de-excitation in which the magnetic energy stored in the inductance is raised or lowered and to the phase of constant flow of current through the inductance.

The method can be applied to all rectifier circuits having a plurality of rectifier paths, particularly a multiple full bridge rectifier circuit.

Optionally, a freewheeling path may be provided which accepts the current for the inductance when it does not need to be altered.

The method and device can be applied as a whole for all resistive-inductive loads, excitation devices for electric machines and field coils for generating magnetic fields. In this context, it is advantageous that the method is suitable for particularly low-loss conversion on the voltage transformer's secondary side facing the inductance, the voltage transformer comprising a primary-side inverter, a transformer and a secondary-side rectifier. The voltage transformer can be operated in two quadrants in order to achieve de-excitation and excitation of the inductance while the secondary-side current direction is constant.

The method can be used particularly advantageously for feeding HTS excitation windings. Alternatively, the method and device can be applied for other windings in electric machines.

In the case of the circuit arrangement with a specific rectifier, the converter valves comprise power semiconductors. The power semiconductors used are advantageously MOSFETs because they have no pn junction with the associated forward voltage UAK and the resultant losses. Preferably, a converter valve is respectively formed by two reverse-connected series MOSFETs in order to be able to set up a reverse voltage with positive and negative polarity, since an individual MOSFET has no inhibiting action in the reverse direction on account of the intrinsically contained diode.

Alternatively, the power semiconductors used may also be thyristors, IGBTs, GTOs or IGCTs.

In the case of the indicated solution to the problem, it is possible to use not only the transformer and the rectifier but also optionally a freewheeling path in parallel with the excitation winding. This freewheeling path can advantageously be used to route the current when its level does not need to be altered. In this case, the current can thus be routed on a short path via a low-impedance converter valve without the need for the current to flow via the transformer's windings.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

In the following description, particularly in FIG. 1, a transformer is assumed in line with a parallel German patent application from the applicant with the same application priority. With regard to the disclosure of the units connected upstream of the transformer, reference is made to this parallel application, inter alia.

Figure 1:
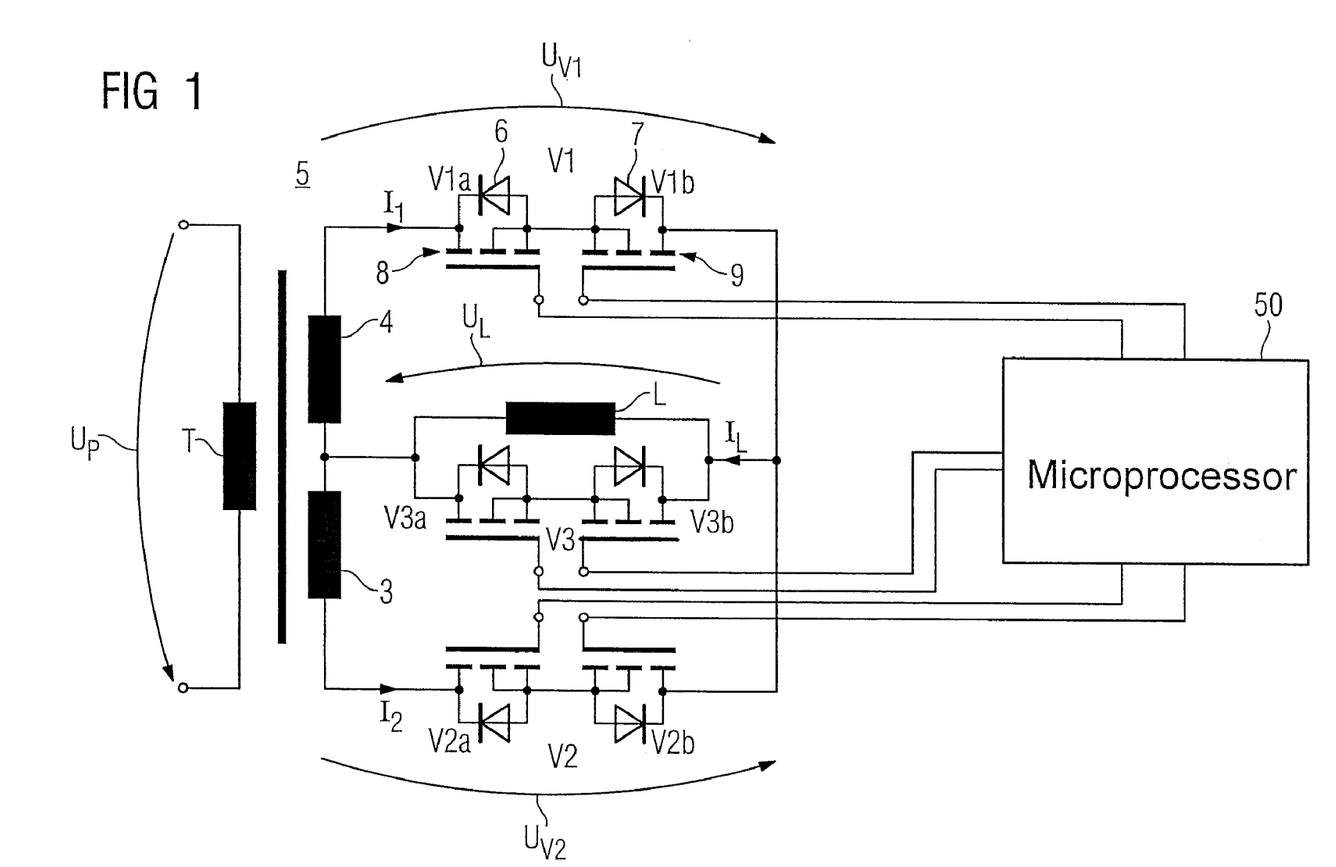
FIG. 1 shows a two-path rectifier in a center-tap connection with a freewheeling path, the individual switching elements being formed by MOSFETs which are actuated by a microprocessor.

FIG. 1 shows a transformer 5 having a primary side and a secondary side. The primary side of the transformer 5 is actuated by a primary voltage $U_p$ at a suitable frequency, the voltage source and the inverter not being shown in detail.

The secondary-side rectifier arrangement shown in FIG. 1 is controlled by a microprocessor 50 on the basis of a sequential program. The sequential program implements a particular actuation regime and is described in detail further below with reference to FIGS. 2 to 5.

FIG. 1 also shows the electrical engineering symbols for the individual elements. In this context:

T: is a converter transformer with a secondary-side center tap
L: is a resistive-inductive load or inductance to be actuated
V1: is a converter valve in the top path
V2: is a converter valve in the bottom path
V3: is a converter valve in the freewheeling path
V1a, V1b, V2a, V2b, V3a, V3b: are MOSFETs as power semiconductors, including an intrinsically provided body diode
$I_1$: is the current in the top path
$I_2$: is the current in the bottom path
$I_L$: is the current through the inductance
$U_P$: is the primary-side voltage on the converter transformer
$U_S$: is the secondary-side voltage on the converter transformer per winding—corresponds to ü★$U_P$
$U_{V1}$: is the voltage across the top converter valve
$U_{V2}$: is the voltage across the bottom converter valve
$U_L$: is the voltage across the inductance/the freewheeling circuit In FIG. 1, 3 and 4 also signify the secondary coils of the converter transformer 5. The converter transformer 5 has two converter valves V1 and V2, each comprising the reverse-connected series MOSFETs V1a and V1b and also V2a and V2b, associated with its secondary side. In addition, a converter valve V3 comprising the reverse-connected series MOSFETs V3a and V3b is provided for a freewheeling path.

The individual MOSFETs distinguished by a and b are each reverse-connected in series with one another. Each MOSFET contains an intrinsic body diode, which is likewise shown in FIG. 1, by virtue of the principle. Alternatively, extra diodes may be provided outside the MOSFETs in order to relieve the load on the intrinsic body diodes.

Instead of the two-pulse rectifier circuit with a center tap shown in FIG. 1, it is possible to use any other rectifier circuit with a plurality of rectifier paths, particularly multiple full bridge rectifier circuits.

Figure 2:
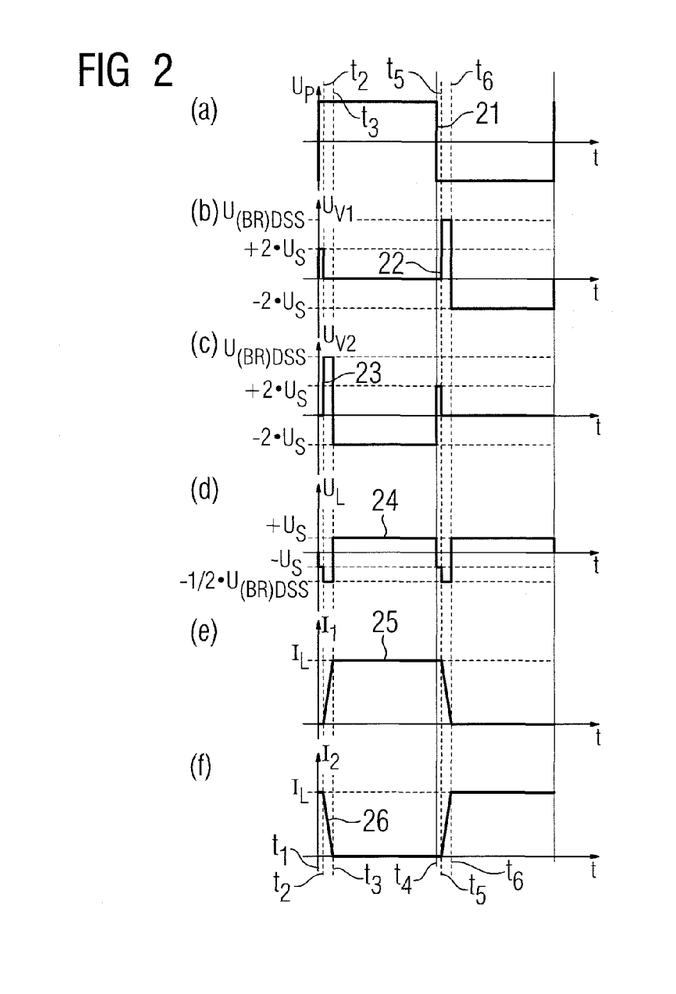
FIG. 2 shows the profile of the signals with reference to the primary voltage $U_P$ when the inductance is excited on the basis of the related art, and the associated actuation of the converter valves.
Figure 3:
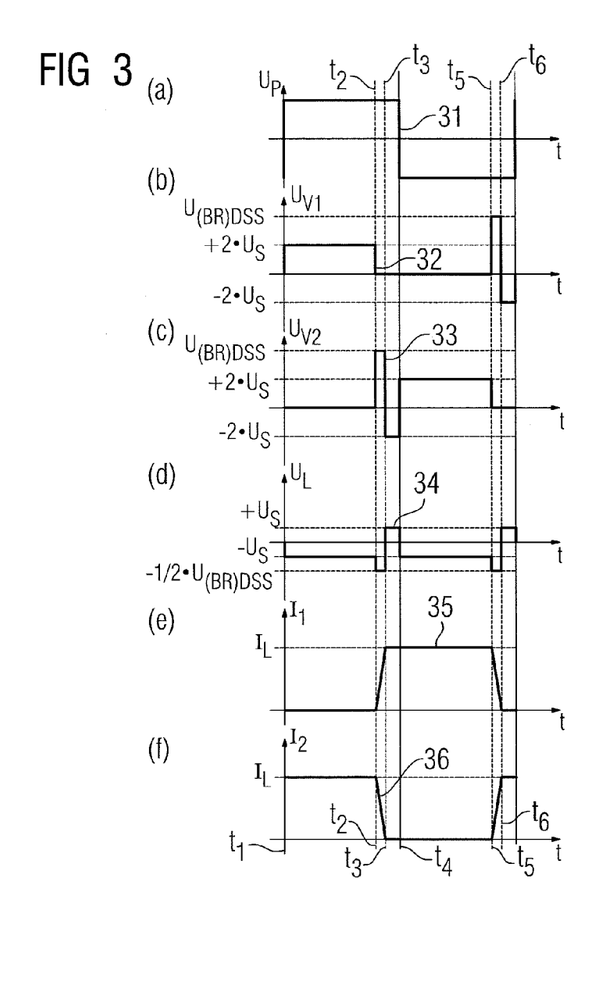
FIG. 3 shows the profile of the signals with reference to the primary voltage $U_P$ when the inductance is de-excited on the basis of the related art, and the associated actuation of the converter valves.
Figure 4:
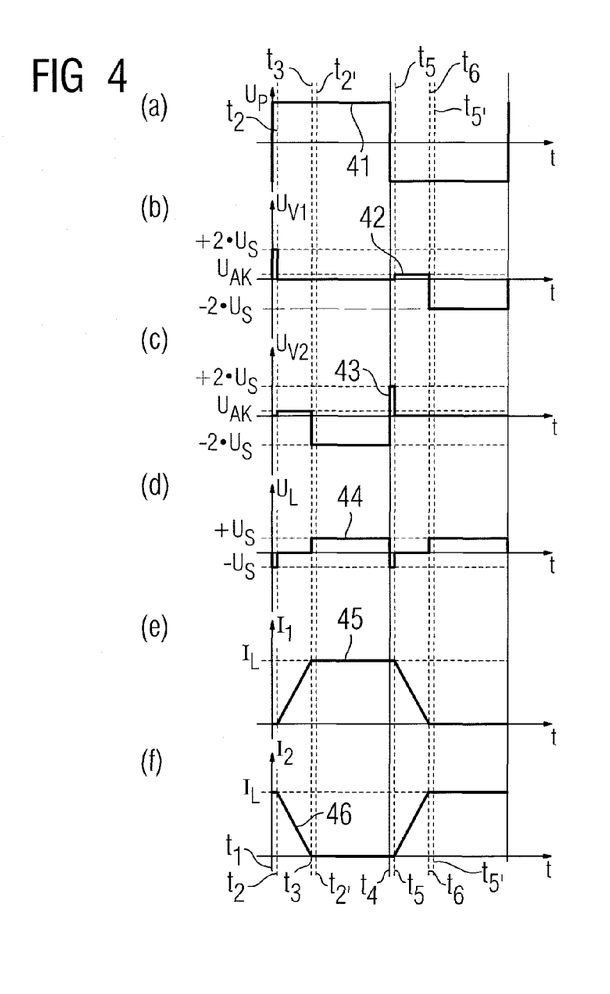
FIG. 4 shows the profile of the signals with reference to the primary voltage $U_P$ when the inductance is excited with improved actuation of the converter valves.
Figure 5:
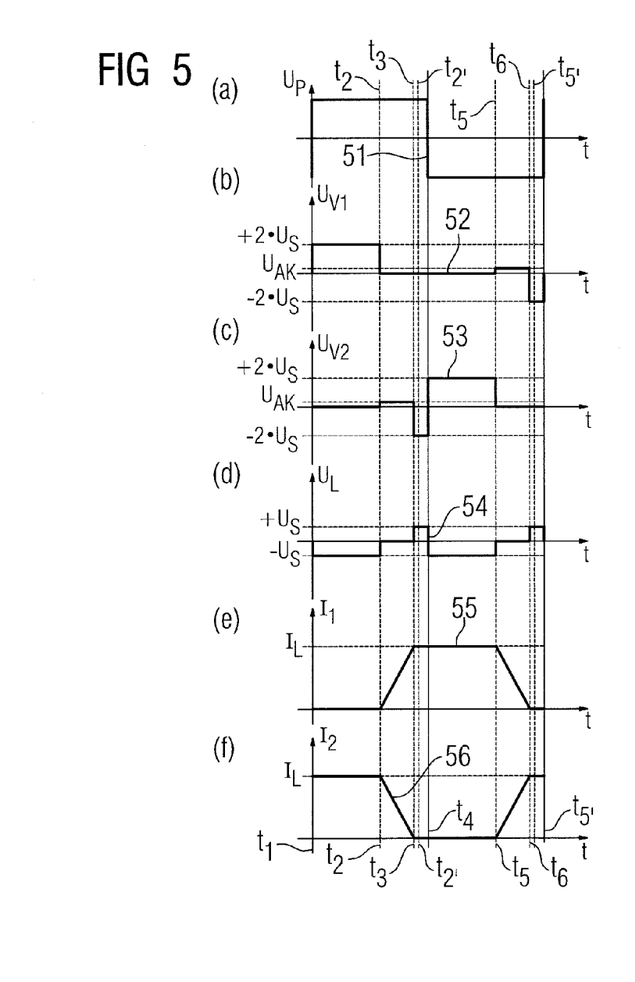
FIG. 5 shows the profile of the signals with reference to the primary voltage $U_p$ when the inductance is de-excited with improved actuation of the converter valves.
Figure 6:
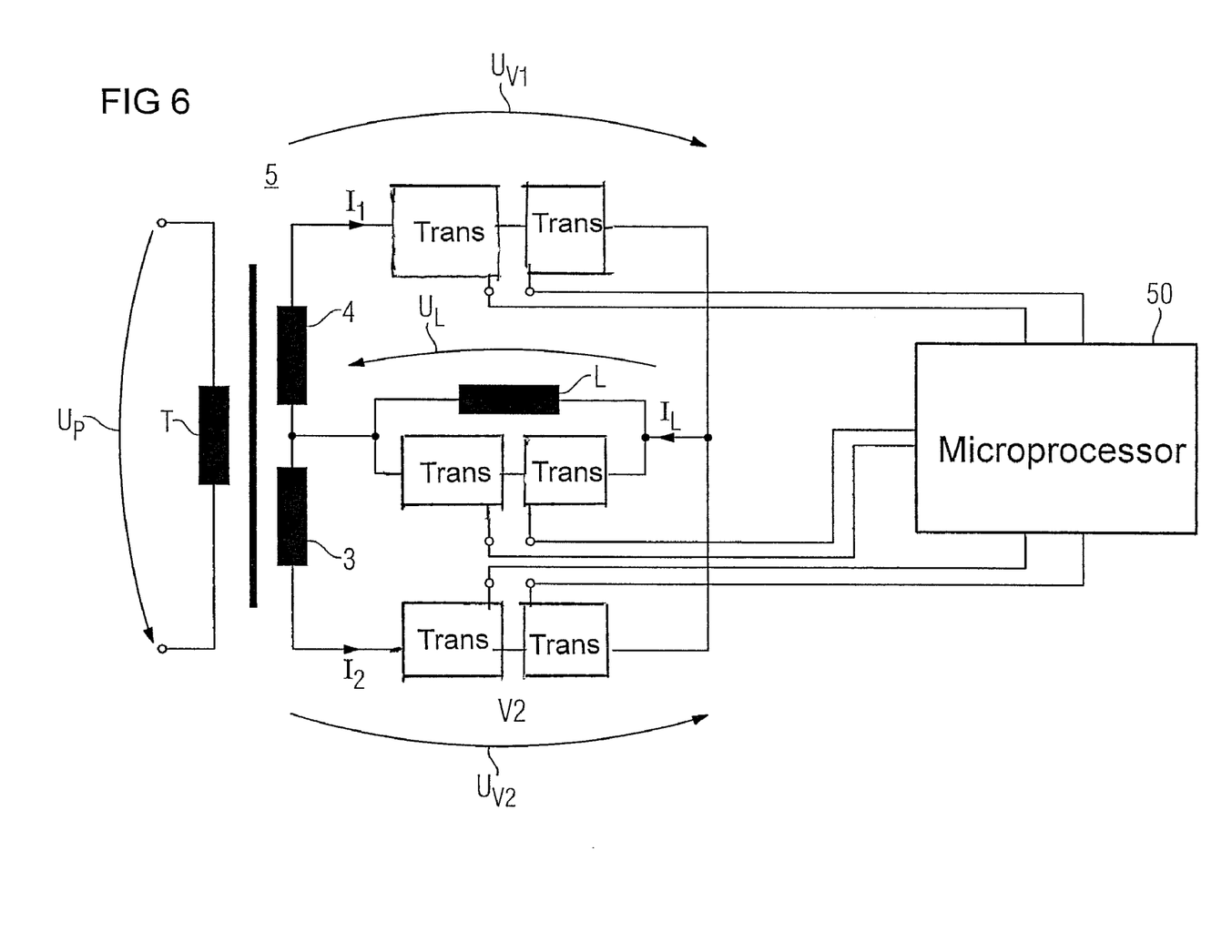
FIG. 6 shows the two-path rectifier of FIG. 1 with the FIG. 1 MOSFETs replaced by generic transistor elements, and FIGS. 7A-7D respectively show thyristor, IGBT, GTO and IGCT circuit symbols as examples of possible switching elements for the two-path rectifier shown in FIG. 6.
Figure 7A:
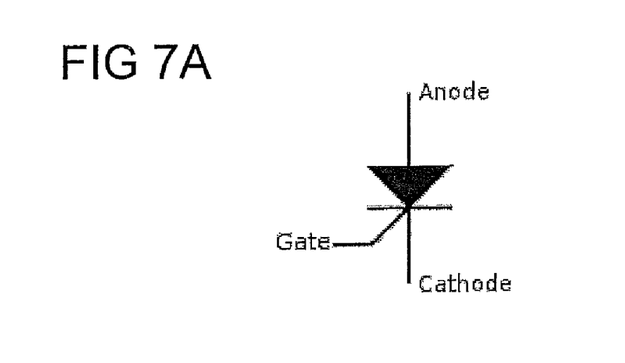
Figure 7B:
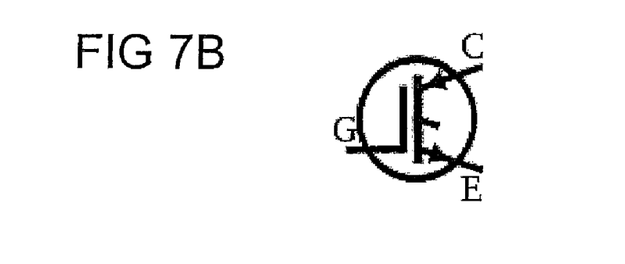
Figure 7C:
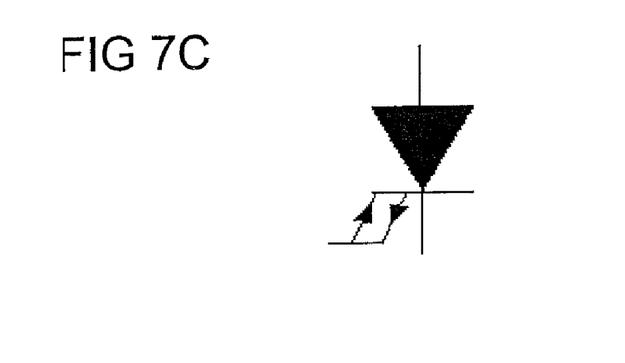
Figure 7D:
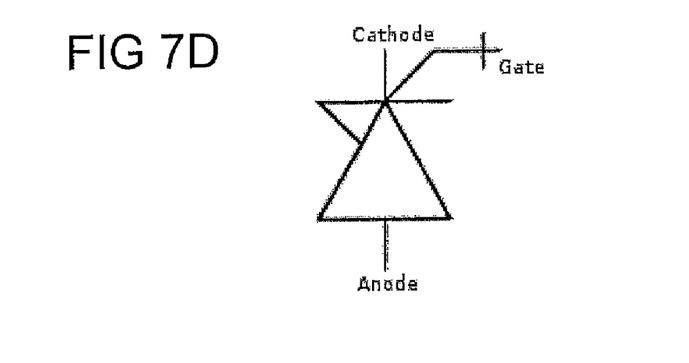

FIGS. 2 to 5 respectively show the time on the abscissa and alternately plot the following variables on the associated ordinate:

$U_P$: primary-side voltage on the converter transformer
$U_{V1}$: voltage across the top converter valve
$U_{V2}$: voltage across the bottom converter valve
$U_L$: voltage across the inductance L/the freewheeling circuit
$I_1$: current in the top converter valve
$I_2$: current in the bottom converter valve FIG. 2 produces the graphs 21 to 26, FIG. 3 produces the graphs 31 to 36, FIG. 4 produces the graphs 41 to 42 and FIG. 5 produces the graphs 51 to 55.

In this context, FIGS. 2 and 3 first of all show the operation of the two-pulse rectifier based on the related art and FIGS. 4 and 5 show the improved operation of the two-pulse rectifier with reduced power loss as a result of improved commutation of the current.

FIGS. 2 and 3 show significant times $t_x$ for the commutation based on the related art as follows:

t1, t4: polarity change for the primary-side transformer voltage
t2: power semiconductors V1a and V1b switched on and V2a and V2b switched off
t3, t6: end of the current commutation
t5: power semiconductors V2a and V2b switched on and V1a and V1b switched off.

In the case of the described design and actuation of the rectifier shown in FIG. 1, it is fundamental that the energy losses during commutation of the current between the converter valves are reduced.

A freewheeling path in parallel with the excitation winding can carry or short the current when its level does not need to be altered. This means that the current does not need to be routed via the inevitably higher nonreactive winding resistances of the transformer but rather can be routed on a short path via the low-impedance converter valve V3. In addition, the hysteresis loss in the transformer disappears because the voltage can be switched off during the freewheeling phase.

In the steady state, in which the excitation current is neither raised nor lowered, the excitation device therefore needs to be activated only occasionally to compensate for residual losses when superconducting inductances are actuated, the low-loss freewheeling path being active for most of the time.

A fundamental cause of the losses in the rectifier is the commutation operation from one converter path or converter valve to the other converter path or converter valve. By way of example, in the case of the rectifier shown in FIG. 1, the current needs to be commutated from the converter valve V1 to the converter valve V2—and accordingly also back.

When the valves based on the related art are actuated, this is done by switching on the two MOSFETs V2a/V2b together and at the same time or immediately afterwards switching off the two MOSFETs V1a/V1b together, times t2 and t5 in FIGS. 2 and 3. The current which is driven further by the excitation winding L cannot commutate from one converter valve of the rectifier to the other at infinite speed, however, because the magnetic energy first needs to be lowered or raised in the leakage inductances of the transformer's current-carrying windings. In the case of the stated type of valve control based on the related art, this is done by virtue of the converter valve in the path from which commutation is to take place (i.e. the path which the current leaves) raising a reverse voltage, which is essentially corresponds to the drain-source breakdown voltage $U_{(BR)DSS}$ of the MOSFET V1a (V2a) used in the converter valve, from time t2 or t5 onward. This voltage brings about a fall in the current in the path from which commutation is to take place and a rise in the current in the accepting path, the sum of both currents always corresponding to the current $I_L$ through the inductance L. For the time of the commutation up to the time t3 or t6, this is associated with high losses in the converter valve of the path from which commutation is to take place, particularly the MOSFETs V1a and V2a, as can be seen from the increased voltage across the converter valves.

This means that the energy stored in the leakage inductances is converted to heat upon every commutation operation in the converter valves in the known method of actuation. Besides the unwanted introduction of heat, the valve is therefore used at a critical operating point, which has an adverse effect on reliability.

One improved option is to switch on the two converter valves V1 and V2 together for a certain time and hence to set up a short circuit. If this is done at a time when the primary-side and hence secondary-side voltage of the converter transformer is oriented such that the current $I_1$ is lowered and the current $I_2$ is raised then the current $I_1$ will be reduced and the current $I_2$ will be increased, this being brought about solely by the secondary-side voltage. The valve V1 now needs to be switched off exactly at the zero crossing in the current $I_1$.

If the valve is switched off too early then a magnetic residual energy remains stored in the unavoidable leakage inductances of the transformer and in turn needs to be lowered by the drain-source breakdown voltage $U_{(BR)DSS}$ → see above.

If the valve is switched off too late, the current $I_1$ will become negative after its zero crossing and the current $I_2$ will rise beyond the current $I_L$. The negative $I_2$ is again switched off by the source breakdown voltage $U_{(BR)DSS}$.

In both cases, sudden switching off results in high voltage spikes and consequently high power losses.

Since the commutation time is dependent on the level of the current through the inductance which is to be commutated, the time difference between switching on V2 and switching off V1 cannot be kept constant, which means that pure time control is eliminated. By contrast, detecting the current's zero crossing is complex and susceptible to error.

It is now fundamental that the two MOSFETs in the converter valve are not actuated together but rather separately such that first of all only the MOSFET V1b is switched off. The intrinsic MOSFET diode or else an additionally provided, parallel connected diode means that the converter valve V1 acts as a freewheeling valve across the MOSFET V1a which is still switched on and the diode in V1b. At the same time, the two MOSFETs V2a/V2b are switched on together. If this is done at a time at which the voltage on the secondary windings of the transformer is oriented such that the current $I_1$ is lowered and the current $I_2$ is raised (see above) then the commutation is forced by the voltage provided by the transformer.

Following the lowering of the current $I_1$ in the commutation phase, the current $I_1$ in the converter valve V1 is interrupted by the diode of V1b automatically at the zero crossing, so that the voltage provided by the transformer cannot drive a reverse current. Losses are therefore caused only by the forward voltage $U_{AK}$ of the diode. When the current $I_1$ has subsided to zero, the second power semiconductor V1a is also switched off. This switching off of V1a is not coupled directly to the zero crossing of I1, but rather can take place at a certain interval thereafter. This interval is proportioned such that the maximum excitation current can be commutated. However, V1a must be switched off before the voltage on the secondary windings of the transformer changes its polarity.

The signal profiles for the improved method are shown in FIG. 4 for the excitation and in FIG. 5 for the de-excitation. These Figs show significant times $t_x$ as follows:

t1, t4: polarity change for the primary-side transformer voltage
t2: power semiconductors V1a and V1b switched on an V2b switched off
t3, t6: end of current commutation
t2': V2a switched off
t5: power semiconductors V2a and V2b switched on and V1b switched off
t5': V1a switched off Whether the circuit is operated in excitation mode or de-excitation mode is decided by the position of the times t2, t2', t3, t5, t5' and t6, identifying the current commutation, relative to the times of the polarity change t1 and t4 for the primary-side transformer voltage.

It becomes clear that exactly switching off at the zero crossing at the diode in the valve V1b avoids a loss of energy in the commutation operation.

This current commutation from one of the converter valves V1 or V2 in the freewheeling path, embodied by the converter valve V3, takes place in similar fashion.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for supplying energy to and discharging energy from a resistive-inductive load or pure inductance, which is used to produce a magnetic field, comprising:
   supplying electrical power to the resistive-inductive load or pure inductance for excitation and de-excitation at a relatively high voltage in order to reduce thermal losses;
   using a rectifier with a low power loss and converter valves to commutate current and to feed the resistive-inductive load or pure inductance;
   using the rectifier and a transformer to transform voltage, the transformer having primary and secondary sides;
   actuating the converter valves to reduce commutation losses on the secondary side of the transformer, wherein a freewheeling circuit accepts the current after the rectifier and the transformer are switched off, and
   the current is commutated into the freewheeling circuit in line with commutation between different rectifier paths.

2. The method as claimed in claim 1, wherein the converter valves are actuated such that commutation of current is brought about exclusively by a voltage at the secondary-side of the transformer.

3. The method as claimed in claim 1, wherein
   the rectifier is a multipath rectifier having a plurality of rectifier paths.

4. The method as claimed in claim 3, wherein
   the rectifier paths have respective converter valves,
   each converter valve comprises two reverse-connected series power semiconductors, and
   the power semiconductors having substantially no inhibiting action in a reverse direction.

5. The method as claimed in claim 3,
   wherein the converter valves are provided in respective different paths of the rectifier, and the converter valves in the respective different paths are switched on simultaneously in particular time periods.

6. The method as claimed in claim 1, wherein the converter valves are switched on after a delay during communication of the current to reduce power loss in the converter valves.

7. The method as claimed in claim 1, wherein the rectifier is a two-path rectifier with a center tap with two converter valves.

8. The method as claimed in claim 1,
wherein the resistive-inductive load or pure inductance comprises superconductive coils.

9. A circuit device to supply energy to and discharge energy from a resistive-inductive load or pure inductance, which is used to produce a magnetic field, comprising:
a voltage source to supply electrical power to the resistive-inductive load or pure inductance for excitation and de-excitation, the voltage source producing a relatively high voltage to reduce thermal losses;
a rectifier having at least two rectifier paths and at least two reverse-connected series converter valves to commutate current and feed the inductance, the converter valves substantially lacking an inhibiting action in a reverse direction of each rectifier path, the rectifier having a reduced power loss as a result of specific actuation of the converter valves;
a transformer having primary and secondary sides, the rectifier and the transformer transforming voltage; and
a freewheeling circuit which accepts the current when the transformer and the rectifier are switched off, the current being commutated to the freewheeling circuit from the rectifier paths.

10. The circuit device as claimed in claim 9, wherein the rectifier is a two-pulse rectifier circuit with a center tap.

11. The circuit device as claimed in claim 9, wherein the rectifier comprises a multiple full bridge rectifier circuit.

12. The circuit device as claimed in claim 9, wherein each converter valve contains a MOSFET with an intrinsically contained or parallel connected diode to substantially eliminate the inhibiting action in the reverse direction.

13. The circuit device as claimed in claim 9, wherein each converter valve contains a power semiconductor, the power semiconductors are thyristors, IGBTs, GTOs or IGCTs.

14. The circuit device as claimed in claim 13, wherein the power semiconductors have parallel connected diodes to substantially eliminate the inhibiting action in the reverse direction.

15. The circuit device as claimed in claim 9, further comprising a microprocessor to control the converter valves based on a prescribed program.

* * * * *